United States Patent
Allen

(10) Patent No.: US 11,640,765 B2
(45) Date of Patent: *May 2, 2023

(54) EXPOSURE-TIME-BASED COST FUNCTION FOR ROUTE PLANNING

(71) Applicant: Rockwell Collins, Inc., Cedar Rapids, IA (US)

(72) Inventor: Keith M. Allen, Centreville, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/117,340

(22) Filed: Dec. 10, 2020

(65) Prior Publication Data

US 2022/0189313 A1 Jun. 16, 2022

(51) Int. Cl.
*G08G 5/00* (2006.01)

(52) U.S. Cl.
CPC .......... *G08G 5/006* (2013.01); *G08G 5/0034* (2013.01); *G08G 5/0039* (2013.01); *G08G 5/0073* (2013.01)

(58) Field of Classification Search
CPC .... G08G 5/006; G08G 5/0034; G08G 5/0039; G08G 5/0073; G08G 5/0021; G08G 5/0052; G08G 5/0082; G08G 5/0091; G08G 5/045; G01C 21/20
See application file for complete search history.

(56) References Cited

U.S. PATENT DOCUMENTS

| | | | |
|---|---|---|---|
| 7,194,353 B1 * | 3/2007 | Baldwin | G08G 5/0086 701/528 |
| 8,155,866 B2 | 4/2012 | Berard et al. | |
| 8,234,068 B1 | 7/2012 | Young et al. | |
| 8,725,417 B1 | 5/2014 | Young et al. | |
| 8,843,303 B1 | 9/2014 | Young et al. | |
| 9,524,647 B2 * | 12/2016 | Kohn-Rich | G08G 5/0052 |
| 10,490,091 B1 | 11/2019 | Lenhardt et al. | |

(Continued)

FOREIGN PATENT DOCUMENTS

WO 2020053785 A1 3/2020

OTHER PUBLICATIONS

Young, S. Y. et al., "Intelligent hazard avoidance system," 2009 IEEE/AIAA 28th Digital Avionics Systems Conference, Orlando, FL, 2009, pp. 5.A.4-1-5.A.4-16, doi: 10.1109/DASC.2009.5347473.

(Continued)

*Primary Examiner* — Shon G Foley
(74) *Attorney, Agent, or Firm* — Suiter Swantz pc llo

(57) ABSTRACT

A system and method are disclosed. The system includes a computer readable medium having non-transitory computer readable program code embodied therein for risk-aware contingency flight re-planning. The computer readable instructions include instructions, which when executed by a computer device or processors, perform and direct the step of receiving a preplanned route, receiving a risk tolerance level from a decision maker, receiving input from a database, receiving an indication of an en route risk to the vehicle, determining an association of an exposure cost with at least one of a plurality of 4-D paths, ranking the plurality of 4-D paths based on the association of the exposure cost, and displaying a portion of the plurality of 4-D paths to the decision maker.

11 Claims, 10 Drawing Sheets

(56) References Cited

U.S. PATENT DOCUMENTS

| | | |
|---|---|---|
| 2006/0031004 A1 | 2/2006 | Lundberg |
| 2010/0145552 A1 | 6/2010 | Herman et al. |
| 2017/0229021 A1 | 8/2017 | McCann et al. |
| 2019/0094852 A1 | 3/2019 | Cavallar et al. |
| 2020/0043350 A1 | 2/2020 | Cantrell et al. |
| 2020/0250596 A1 | 8/2020 | Matthews et al. |
| 2020/0286391 A1 | 9/2020 | Beaurepaire et al. |

OTHER PUBLICATIONS

Extended Search Report in European Application No. 21211605.7 dated Apr. 29, 2022, 10 pages.

* cited by examiner

| 4D State Status | Value |
|---|---|
| Uninitialized | Int Last - (2*N) |
| Unoccupied | Int Last - (2*N+1) |
| A* State IDs | 0 ≤ Int Last - (2*N+1) |

| 4D State Status | Lethal Level N | Lethal Level N-1 | Lethal Level N-2 | ... | Lethal Level 1 |
|---|---|---|---|---|---|
| Occupied needs terrain mask check | Int Last | Int Last - 1 | Int Last - 2 | ... | Int Last - (N - 1) |
| Occupied | Int Last - N | Int Last - (N+1) | Int Last - (N+2) | ... | Int Last - (2*N - 1) |

| Risk Type (RT) | Risk Tolerance Level (RTL) | | | | |
|---|---|---|---|---|---|
| | Level 0 | Level 1 | Level 2 | Level 3 | Level 4 |
| Threat | 0 | $\eta_1$ | $\eta_2$ | $\eta_3$ | $\eta_4$ |
| Fuel | 0 | $\mu_1$ | $\mu_2$ | $\mu_3$ | $\mu_4$ |
| Required Time on Target | 0 | $\mu_1$ | $\mu_2$ | $\mu_3$ | $\mu_4$ |

FIG. 5A

EXPOSURE-TIME-BASED COST FUNCTION FOR ROUTE PLANNING

BACKGROUND

Aircraft may encounter expected threats along a route during the transit portion of a mission. Such threats may include weather, winds, terrain, obstacles, a hostile surface threat, and a hostile airborne threat. These expected or pre-planned threats may pose a certain level of risk to an aircrew and passengers before a mission is begun. A commander or dispatcher may rely on these known threats to make critical decisions concerning the flight.

Such critical pre-mission decisions may include a fueling amount, a cargo load, a weapons loadout, a specific configuration (e.g., one or two external fuel tanks, more or less ordnance, more counter air ordinance, more counter surface ordnance), a dispatch limit based on external statutory regulations, and aircrew flight time limitations. As a flight may progress over time, these pre-mission decisions may become inaccurate or obsolete.

Aircraft may also encounter unexpected threats en-route to a destination. Such unexpected threats may include a changed weather system, a pop-up signal jammer, an unplanned surface-to-air missile radar or battery, a volcano eruption, or a recently erected obstacle. Since risk-free paths may be ineffective for a number of reasons, these unexpected threats may require a pilot to shoulder an unknown additional level of risk in order to accomplish the primary objectives of the mission.

Unexpected threats may pose additional risk to an aircrew if the aircrew makes a routing decision based on inaccurate or obsolete information. Also, the aircrew may suffer loss of situational awareness leading to a routing decision which may lead the aircraft into a more hazardous situation than would be the case had an accurate routing decision been made or the aircraft has stayed the originally planned route.

A specific route of flight may present a specific level of risk to a pilot. For example, to reach a target at a required time-on-target (RToT), the flight path may be required to penetrate known threat zones of low-level lethality. Such low-level lethality zones may include a detection range of a surveillance radar system or within a detection range of a target tracking radar system.

These low-level lethality threat zones however do not include zones within which a flight may experience a high level of lethality. Such high-level lethality may be found within an engagement range of surface to air missiles or within the range of air to air weapons. The lethality of these threat zones may be reduced by shortening exposure to the threat zone. However, the relationship of the time of exposure to a threat zone and the risk of lethality to a threat zone are not necessarily linear. For example, an incursion into the engagement range of surface to air missiles may present a low threat level for the short amount of time that it takes to activate the surface to air missile, and a high threat level after the surface to air missiles have likely been activated.

Pilots are under considerable stress in a combat environment. Decisions made based on erroneous information or decisions made quickly without regard to possible threats may place an aircraft in a more lethal zone than a previous zone. Should a decision be inaccurate, consequences may be catastrophic.

Traditional methods of risk reduction may be labeled differently by entities tasked with least risk routing. The U.S. Air Force labels the technique used by some Air Force planners Reduced Risk Routing as the goal may be to reduce risk inherent to a specific routing. One intended purpose of the Reduced Risk Routing capability is to facilitate a pilot's decision-making process, while increasing aircraft survivability in dense threat environments.

Commercial air carriers may label a specific route as a "track" offering an optimized routing in a geographic area. For example, North Atlantic Tracks are published daily and indicate to aircraft transiting the North Atlantic a preferred route through that airspace based on winds, weather, and additional factors.

Sea surface traffic may also endeavor to transit on routes which offer the least amount of risk for ships at sea. For example, a Sail on Routes that Reduce Risk guidance may be offered to navigators to enable ships to transit an area while doing so at a lower risk level.

A ground-based platoon commander may visually survey a geographical area before determining a level of risk associated with the proposed routing. Should the commander visually acquire a threat along the route, he may alter the proposed routing to reduce or eliminate the threat.

On-board computing resources may be limited to reduce weight and power consumption. For example, computing resources on a fighter jet may be a fraction of that available to a team of route planners in a ground-based operations center. Placing powerful heavyweight computers onboard an aircraft may be one traditional method of solving the problem. However, aircraft performance suffers as an equal reduction in payload must be made. These attempts at real time path planning have proven unreliable or ineffective when attempted to be incorporated in a lightweight tactical platform.

Consequently, a need exists for development of a real time risk-aware contingency flight re-planner capable of automated presentation of accurate, time sensitive, re-route planning information on-board a light weight platform. Each re-route including a threat level associated with the re-route enabling a decision maker to make an informed threat-based decision.

SUMMARY

A system is disclosed. In one or more embodiments, the system includes a computer readable medium having non-transitory computer readable program code embodied therein for risk-aware contingency flight re-planning. In some embodiments, the computer readable instructions include instructions, which when executed by a computer device or processors, perform and direct the step of receiving a preplanned route, wherein the preplanned route is configured for a 3-D routing of a vehicle, and wherein the preplanned route is activated within the vehicle prior to a departure of the vehicle. In some embodiments, the instructions, which when executed by a computer device or processors, further perform and direct the steps of receiving a risk tolerance level from a decision maker, receiving input from a threat database, a terrain database, an obstacle database, a threat lethality database, a fuel evaluator, a terrain masking evaluator, a time evaluator, and a vehicle performance database and receiving an indication of an en route risk to the vehicle, wherein the en route risk includes a risk type. In some embodiments, the instructions, which when executed by a computer device or processors, further perform and direct the steps of determining a plurality of 4-D paths for the vehicle to traverse, wherein each 4-D path includes a plurality of 4-D states, and wherein each 4-D state selected for the 4-D path configured based on the risk tolerance level and the received input, determining an association of at least one of a path cost, a time cost, a threat level, an arc cost, and an extra traversal cost with at least one of the plurality of 4-D paths, and determining an association of an exposure cost with at least one of the plurality of 4-D paths. In some embodiments, the instructions, which when executed by a computer device or processors, further perform and direct the steps of ranking the plurality of 4-D paths, wherein the ranking is based on the risk tolerance level, the risk type, the association of the exposure cost, and the association of at least one of the path cost, the time cost, the threat level, the arc cost, and the extra traversal cost, and displaying a portion of the plurality of 4-D paths to the decision maker, wherein the portion is determined by the ranking of the plurality of 4-D paths.

In some embodiments of the system, the exposure cost tracks a function of time that the vehicle is in a threat zone.

In some embodiments of the system, the exposure cost tracks a cumulative function of time that the vehicle is in one or more threat zones.

In some embodiments of the system, preplanned route planned for the 3-D routing of the vehicle further includes a 3-D route planned for an aircraft.

In some embodiments of the system, the preplanned route planned for the 3-D routing of the vehicle further includes a 4-D path, a 3-D path, and a 2-D path In some embodiments of the system, the risk tolerance level further includes a plurality of levels of risk tolerance, the plurality of levels of risk tolerance based on the input from the decision maker.

In some embodiments of the system, the received input further includes an attribute of a medium through which the vehicle is designed to traverse.

In some embodiments of the system, the indication of the en route risk to the vehicle further includes an indication of at least one of a hostile surface threat, a weather threat, a hostile airborne a space-based threat, a restricted airspace threat, or a subsurface threat.

In some embodiments of the system, the risk type further includes one of: a threat risk, a fuel risk, a restricted airspace threat, or a required time on target risk.

In some embodiments of the system, the receiving an indication further includes a reception via at least one of a digital or analog data link, a VHF signal, or a satellite communications system.

In some embodiments of the system, the plurality of 4-D paths for the vehicle to traverse further includes at least one path which remains clear of each of the en route risk to the vehicle.

In some embodiments of the system, the decision maker is the operator.

In some embodiments of the system, the displaying a portion of the plurality of 4-D paths to the decision maker further includes an output configured for an ARINC standard and readable by a specific flight management system.

A method for risk-aware contingency flight re-panning is also disclosed. In one or more embodiments, the method includes receiving a preplanned route, wherein the preplanned route is planned for a 3-D routing of a vehicle, wherein the preplanned route is activated within the vehicle prior to a departure of the vehicle. In some embodiments, the method includes receiving a risk tolerance level from a decision maker. In some embodiments, the method includes receiving input from a threat database, a terrain database, an obstacle database, a threat lethality database, a fuel evaluator, a terrain masking evaluator, a time evaluator, and a vehicle performance database. In some embodiments, the method includes receiving an indication of an en route risk to the vehicle, wherein the en route risk includes a risk type. In some embodiments, the method includes determining a plurality of 4-D paths for the vehicle to traverse, wherein each 4-D path includes a plurality of 4-D states, wherein each 4-D state is selected for the 4-D path based on the risk tolerance level and the received input. In some embodiments, the method includes determining an association of at least one of a path cost, a time cost, a threat level, an arc cost, and an extra traversal cost with each of the plurality of 4-D paths. In some embodiments, the method includes determining an association of an exposure cost with at least one of the plurality of 4-D paths. In some embodiments, the method includes ranking the plurality of 4-D paths, wherein the ranking is based on the risk tolerance level, the risk type, the association of the exposure cost, and at least one of the association of the path cost, the time cost, the threat level, the arc cost, and the extra traversal cost. In some embodiments, the method includes displaying a portion of the plurality of 4-D paths to the decision maker, wherein the portion is determined by the ranking of the plurality of 4-D paths. In some embodiments, the method includes receiving a path selection from the decision maker, wherein the path selection includes designating and activating a selected 4-D path from the portion. In some embodiments, the method includes displaying the activated 4-D path to an operator of the vehicle.

In some embodiments of the method, the exposure cost tracks a function of time that the vehicle is in a threat zone.

In some embodiments of the method, the exposure cost tracks a cumulative function of time that the vehicle is in one or more threat zones.

In some embodiments of the method, the preplanned route planned for the 3-D routing of a vehicle further includes a 3-D route planned for an aircraft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5A is a table of exemplary Risk Type (RT) versus Risk Tolerance Level (RTL) displaying multiple levels of risk and associated values of RiskFactor, in accordance with one or more embodiments of this disclosure;

DETAILED DESCRIPTION

Figure 1:
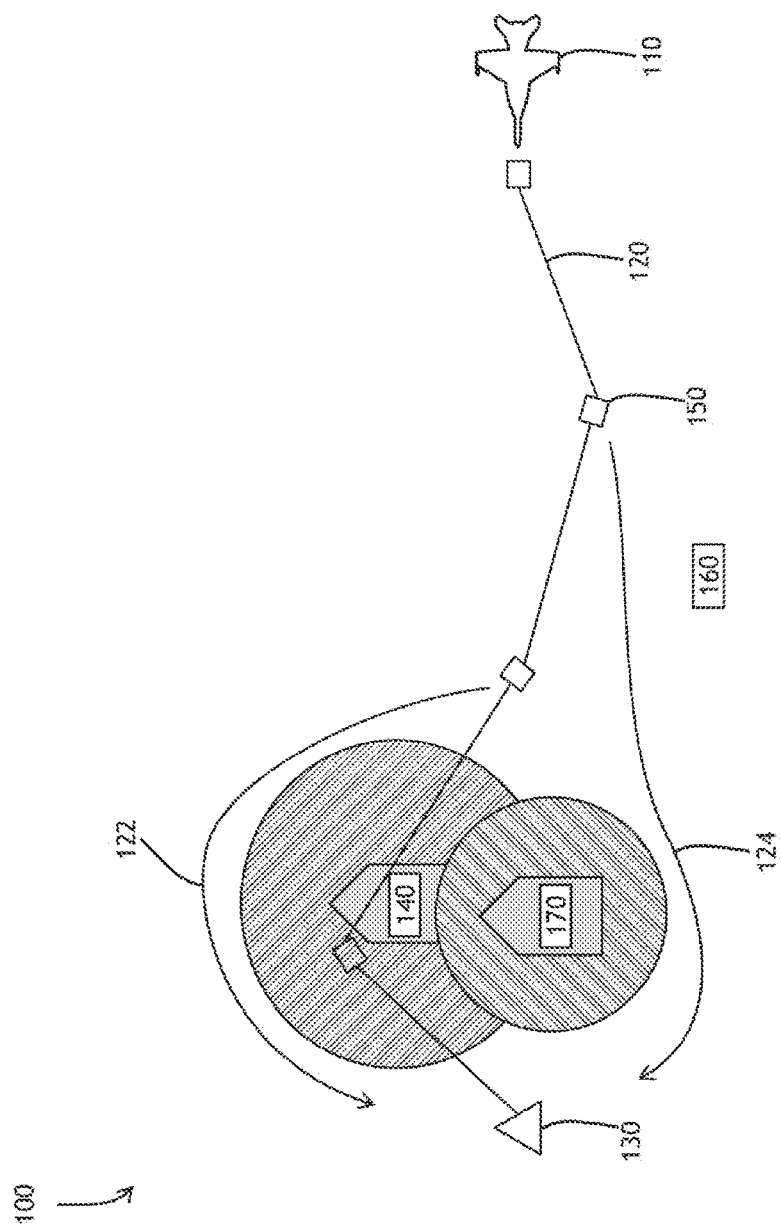
FIG. 1 is an overview of a re-route capability, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

The present discloses described embodiments for a system and a method for risk-aware contingency flight re-planning. The system may include a computer readable medium having non-transitory computer readable program code embodied therein for risk-aware contingency flight re-planning. The system may also include componentry that includes, or is associated with, a risk-aware contingency flight planner. Any type of risk-aware contingency flight planner may be incorporated within the system. For example, the system may include and/or operate in concert with one or more real-time auto routers. For instance, the system may operate with an auto router named Airborne E* (pronounced as E Star) that maintains an in-flight, long-range 4-D trajectory re-planning capability and designed to meet desired automated routing requirements. Airborne E* is described in 1) U.S. Pat. No. 8,234,068B1 ('068 patent), issued Jul. 31, 2012, filed: Jan. 15, 2009, entitled "System, Module, and Method of Constructing a Flight Path Used by an Avionics System," to Young, et. al., and 2) U.S. Pat. No. 8,725,417 ('417 patent) entitled "Rapid Intervisibility Determination in Resource-Constrained Computational Environments" filed on Aug. 27, 2010, by Young, et. al, both of which are incorporated by reference herein in their entirety. Additionally, system and methods configured to operate in concert with or describe auto routers such as Airborne E* are described in U.S. Pat. No. 8,843,303 ('303 patent), issued Sep. 23, 2014, filed Dec. 17, 2012, entitled "Risk-Aware Contingency Flight Re-Planner System and Related Method" to Young, et, al, and U.S. Pat. No. 10,490,091 ('091 patent) entitled "Systems and Methods for Avoidance Traversal Analysis for Flight-Plan Routing" filed on Sep. 21, 2018 by Lenhardt et. al, which are incorporated by reference herein in their entirety.

This and all other referenced patents and applications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

In embodiments, the system may construct alternate routes for a vehicle in motion based on auto router (e.g., such as Airborne E*) path information combined with a threat level of each path. These alternate path options are presented to a decision maker charged with the responsibility of moving the vehicle (e.g., an aircraft) from a first point to a second point. Each of these alternate route decisions is associated with a level of risk when presented to the decision maker. These alternatives offer the decision maker (e.g., a pilot) an ability to accurately make an informed decision based on a time sensitive set of facts.

When constructing alternative paths to achieve mission objectives, the system may receive a plurality of inputs to determine the alternate routes. Such inputs may include a plurality of levels of risk, a risk type, and a decision maker's tolerance to each level of risk. The system analyzes path risk based on the level of threat lethality, the risk type and the user tolerance to risk, when generating a risk-aware flight path for the mission. Furthermore, to enable decision makers to examine the effect of different risk tolerance levels on flight paths, the system generates and displays multiple risk-aware routes with each route designed for a different risk tolerance level.

In some embodiments, the system may empower the decision maker (a pilot, ship's Captain, Platoon commander, etc.) charged with transiting from one point to a second point with the awareness of real time threats along a proposed route. The system may offer a list of proposed alternate routes, and indicate the level of risk associated with each of the proposed new routes enabling the operator the ability to choose the route offering the least risk while still maintaining the integrity of the mission.

In embodiments, the system may include a search of a digital terrain database over a designated area, such as a circle with a radius of 200 nautical miles (NM), to ensure the re-planned long-range paths are free of terrain.

In embodiments, the system may include a calculation of possible benefits of terrain masking enabling the construction of shorter paths while still ensuring the safety of the aircraft from en route threats.

In embodiments, the system may include an analysis of the level of threat lethality in a specific zone and the decision maker's tolerance to risk, while constructing risk-aware routes.

In embodiments, the system may include construction of risk-aware routes that may comply with a required time on target (RToT) constraint.

In embodiments, the system may include simultaneous avoidance of multiple moving and stationary threats.

In embodiments, the system may include construction of a 4-D (3-D plus time) flight plan that is flyable based on aircraft performance capabilities and limitations.

In embodiments, the system may include generation of multiple risk-aware routes with each route designed for a different risk tolerance level. This list of routes may enable the decision maker to examine the effect of different risk tolerance levels on proposed flight paths.

In embodiments, the system may include generation of the risk-aware flight plan in a format that is compatible with Flight Management System (FMS) interfaces for display on various types of cockpit displays.

In embodiments, the system may include completion of the generation of risk-aware flight plans within a designated operationally reliable time period while hosted on an onboard computational platform with limited memory and processor speed.

These embodiments may present a challenge to limited onboard computational resources by requiring a great amount of data to be processed within seconds. The system meets these technical goals by adapting efficient Artificial Intelligence algorithms and functions and taking specific steps to optimize the use of onboard memory.

Optimizing the flight path in-flight to take into account real-time unforeseen events, such as wind conditions, moving storm cells, or pop-up tactical threats, may enable aircraft to fly a safer and more fuel-efficient route than the flight path created before takeoff. However, it is essential that terrain data, aircraft performance limits, and flight operational constraints are also analyzed when modifying the active flight plan in-flight. The system is suited for this kind of tasks and may be used to relieve pilot workload.

In some embodiments, the system may be configured similarly as the Airborne E* (E Star) real-time 4-D flight planner. (e.g., as described in the '068 patent and the '068 patent.) For example, the system may use a layered approach to transform the path planning problem that is non-deterministic polynomial-time hard (NP-hard), to a problem that may be solved efficiently in real-time and in resource-constrained computational environments.

FIG. 1 is a diagram of an example environment 100 of re-route capability provided by risk-aware contingency flight re-panning systems, in accordance with one or more embodiments of this disclosure. Risk-aware contingency flight re-panning systems may include hardware, firmware, and/or software contained within lightweight avionics onboard an aircraft 110. Before departure, the aircraft 110 may be pre-planned on an original route 120 to traverse from a deviation point 150 to a rejoin point 130, or target. For example, the original route 120 may have been planned pre-mission based on available information at the time of planning. The original route 120 is planned to keep a risk level low for the aircraft 110 by remaining clear of a planned threat 170. As the aircraft 110 approaches the deviation point 150, an un-planned threat 140 emerges, causing an unplanned level of risk for the aircraft should the aircraft 110 remain on the original route 120. In embodiments, the risk-aware contingency flight re-panning systems may assist a decision maker (e.g., the pilot of the aircraft 110) by offering one or more alternate routes 122, 124 for the aircraft 110 in order to remain clear of the planned threat 170 and/or the unplanned threat 140.

Figure 2:
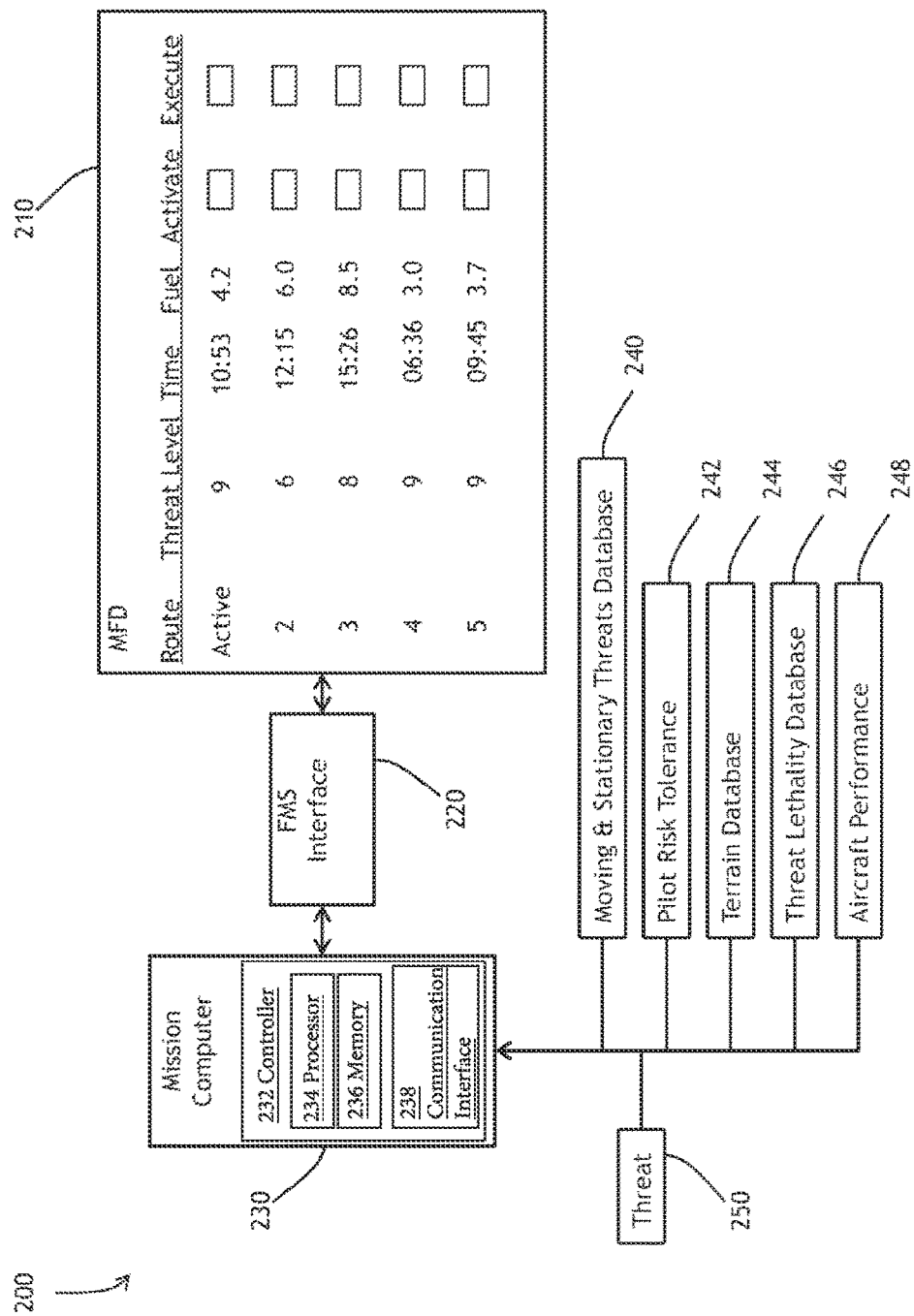
FIG. 2 is a block diagram of component parts onboard a vehicle, in accordance with one or more embodiments of this disclosure.

FIG. 2 illustrates a block diagram of component parts of a system 200 for risk-aware contingency flight re-planning onboard a vehicle, in accordance with one or more embodiments of this disclosure. In one embodiment, one or more aspects of the system 200 configured to operate within lightweight computing resources onboard the aircraft 110 (e.g., a small fighter aircraft). An onboard mission computer 230 may house the computer readable code and computing resources to manage the system 200 and method. For example, the onboard mission computer may include a controller 232, one or more processors 234, a memory 236 (e.g., a computer readable medium), and a communication interface 238. For example, the memory 236 may include code embodied therein that comprises instructions that are then executed by one of the one or more processors 234. The instructions may include one or more steps for performing or directing risk-aware contingency flight re-planning as described herein.

Inputs to the system 200 may include a database of moving and stationary threats 240, a risk tolerance of the pilot or decision maker 242, a terrain database 244, a threat lethality database 246, performance characteristics and limitations of the vehicle or aircraft 248, and an indication of a threat 250.

Output from the mission computer 230 may be configured as a format recognizable by current avionics devices. Such devices may accept data in a format similar to an ARINC standard of avionics data. However, should a specific Flight Management System 200 (FMS) require a specific input, the system 200 may further include an FMS interface 220 to alter the output to conform to the specific input. A Multi-Function Display (MFD) 210 may present details to the decision maker of alternate risk-aware re-routes.

In some embodiments, the controller 232 is communicatively coupled to components within the 220 and componentry related to the system 200 (e.g., FMS, FMS Interface 220, displays, transmitters, user interfaces). The one or more processors 234 may include any one or more processing elements known in the art. In this sense, the one or more processors 234 may include any microprocessor device configured to execute algorithms (e.g., functions) and/or program instructions. In general, the term "processor" may be broadly defined to encompass any device having one or more processing elements, which execute a set of program instructions from a non-transitory memory medium (e.g., the memory 236), where the one or more sets of program instructions is configured to cause the one or more processors 234 to carry out any of one or more process steps.

The memory 236 may include any storage medium known in the art suitable for storing the one or more sets of program instructions executable by the associated one or more processors 234. For example, the memory 236 may include a non-transitory memory medium. For instance, the memory 236 may include, but is not limited to, a read-only memory (ROM), a random-access memory (RAM), a magnetic or optical memory device (e.g., disk), a magnetic tape, a solid-state drive, and the like. The memory 236 may be configured to provide display information to the FMS interface 220. In addition, the memory 236 may be configured to store user input information. The memory 236 may be housed in a common controller housing with the one or more processors 234. The memory 236 may, alternatively or in addition, be located remotely with respect to the spatial location of the processors 234, or the controller 232. For example, the one or more processors 234 and/or the controllers 232 may access a remote memory 236 accessible through a network (e.g., wireless, and the like) via one or more communication interfaces 238.

The one or more communication interfaces 238 may be operatively configured to communicate with components of the controller 232. For example, the one or more communication interfaces 238 may be configured to retrieve data from the one or more processors 234 or other devices, transmit data for storage in the memory 236, retrieve data from storage in the memory 236, and so forth. The one or more communication interfaces 238 may also be communicatively coupled with the one or more processors 234 to facilitate data transfer between components of the controller 232 and the one or more processors 234. It should be noted that while the one or more communication interfaces 238 is described as a component of the controller 232 one or more components of the one or more communication interfaces 238 may be implemented as external components communicatively coupled to the controller 232 via a wired and/or wireless connection.

Contemplated herein, the decision maker may be disposed onboard the vehicle (ship, aircraft 110, etc.). The decision maker may be physically located offboard the aircraft 110. For example, one decision maker may be the single-seat pilot onboard the aircraft 110. Additionally, in a multi seat configured aircraft, a mission commander or Captain may be the decision maker while not necessarily located within the cockpit of the aircraft 110 and in manipulation of the controls. Additionally, an offboard decision maker may be in control of the vehicle via data link and able to select a re-route offered by the system 200.

Figure 3:
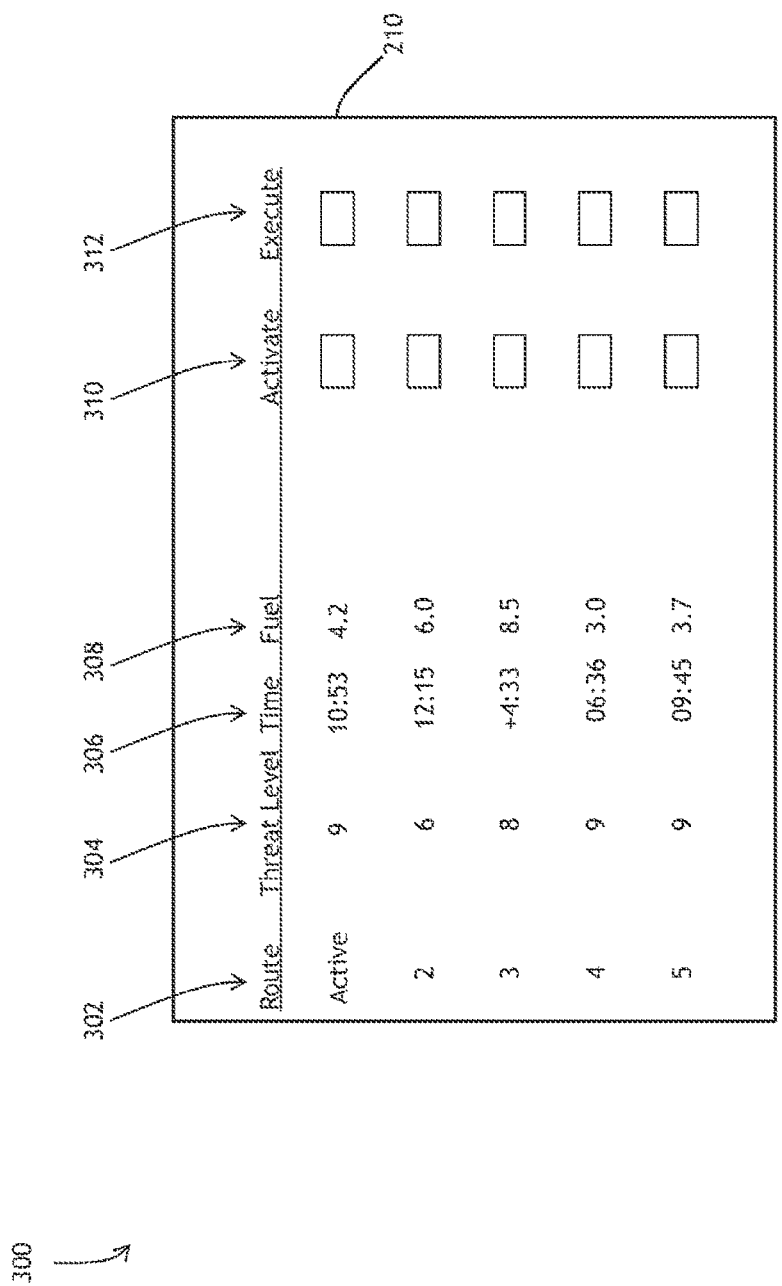
FIG. 3 is a diagram of a multi-function display (MFD), in accordance with one or more embodiments of this disclosure.

Referring to FIG. 3, diagram of a multi-function display (MFD 210) in accordance with one or more embodiments of this disclosure is shown. The MFD 210 may be configured for communication of information from the system 200 to an onboard decision maker. One example of information communicated may include a hierarchy of routes displayed in an order. One order may include the active route at the top followed by routes in order of increasing risk to the vehicle. For example, the second route displayed may be of equal or lesser risk than the third route.

Displayed route choices may include additional information to aid the decision maker in a re-route decision. As indicated, route number 302, a threat level associated with each route 304, the time required (or delta from current en route time) for completion of the route 306, fuel required (or delta) 308, and well-known touch screen options to activate 310 and execute 312 the newly chosen route.

In some embodiments, the system 200 may utilize or adapt Airborne E* to generate risk-aware paths. For example, system 200 may utilize or adapt 4-D states (or cells) of an elevation indexed quadtree-type hierarchical structure known as ELDETREE, that receives inputs embedded with risk and threat (lethality) information. For instance, the ELDETREE method: 1) recursively divides a region based on the current size of the region and the obstacle status of the region and 2) recursively merges nodes based on the difference between the minimum and maximum obstacle elevations) to include lethality information. ELDETREE partitions each geographic reference into "leaf nodes" which are 3-D cubic volumes of variable size which contain a double array of elevation/time indices used to discretize altitude and time.

Figures 4A, 4B:
FIG. 4A is a table of Unoccupied 4-D (3-D plus time) States indicating a 4-D state status and value, in accordance with one or more embodiments of this disclosure.
FIG. 4B is a Lethality Table for Occupied 4-D States indicating a higher lethality level at alternative 4-D states statuses, in accordance with one or more embodiments of this disclosure.

Referring to FIG. 4A, a table of unoccupied 4-D (3-D plus time) states indicating a 4-D state status and value is shown. in accordance with one or more embodiments of this disclosure. The status of each 4-D state is stored as an unsigned 32-bit integer and contains one of the five following statuses: uninitialized, unoccupied, A* state ID, occupied—needs terrain mask check, and occupied.

An uninitialized status may be defined herein as a status where a 4-D state has not been visited by the A* planner of the system 200 yet. The A* planner of system 200, as described in presentation entitled "Intelligent Hazard Avoidance System 200 (IHAS)," 28th Digital Avionics System 200s Conference, given by Young, S. Y., on Oct. 25-29, 2009, is a well-known Artificial Intelligence (AI) algorithm used to create a reference path, which is incorporated by reference herein it its entirety.

An unoccupied status as defined in the '068 patent is a status where the ELDETREE leaf node's elevation/time index is free of terrain and any other obstacles, stationary or moving. If terrain masking is selected, the cell may be located within a threat zone, but masked by terrain relative to threats.

The A* State ID status is defined in the IHAS as a status in which a global planner of system 200, labeled A*, has given a leaf node a 4-D connectivity ability. After a leaf node maintains an A* State ID, additional A* State ID leaf nodes may be able to connect to the leaf node to form a 4-D path.

The next two statuses, occupied—needs terrain mask check and occupied, are further classified with lethality levels for the method to offer path choices based on the lethality of each path. Referring to FIG. 4B, a Lethality Table for Occupied 4-D States indicating a higher lethality level at alternative 4-D states statuses in accordance with one or more embodiments of the disclosure.

This occupied status as defined in the '068 patent as a status where the ELDETREE teal node's elevation/time index is occupied by a static obstacle. This state is only used when terrain masking check is turned on. This state is used to indicate to Airborne E* that the volume is inside the threat zone of a static man-made threat 250 (not terrain) and has not been checked by the terrain masking function. This is a temporary state that the re-planner could later designate as either unoccupied or occupied.

An occupied status as defined in the '068 patent as a status where the ELDETREE leaf node's elevation/time index is occupied by terrain and/or other obstacles. If terrain masking is selected, then this cell has been checked and found to be inside a threat zone and is also visible by a threat 250.

Should a 4-D state be within a threat zone, it is assigned a status of "occupied" or "occupied—needs terrain mask check." Two different occupied statuses are needed to distinguish the need of terrain masking check on this 4-D state. When terrain masking is enabled, all states within threat zones are initially labeled as "occupied—needs terrain mask check." After the 4-D state is explored by system 200 and terrain masking check is performed, the 4-D state status is switched from "occupied needs—terrain mask check" to "occupied" or "unoccupied," depending on the terrain masking result.

When incorporating lethality into ELDETREE, the values for state status "occupied" and "occupied—needs terrain mask check" are expanded by the lethality range, as shown in FIG. 4B. Each 4-D state in ELDETREE is assigned with a specific value listed in FIG. 4A and FIG. 4B, based on the lethality level and state status of this 4-D state. For example, when a 4-D state is within a threat zone and terrain masking is disabled, the value of this 4-D state may be simply set as Integer Last-(2N−1) through a table look-up, given the state status as "occupied" and the lethality level as "Lethal Level 1." Similarly, for a specific value such as Integer Last-(2N−1), the lethality level and state status of this 4-D state may be quickly retrieved from ELDETREE as "Lethal Level 1" and "occupied," respectively.

When terrain masking is checked on a 4-D state and the result is that this 4-D state is still occupied, the value of this state is changed to be the new state status ("occupied") and its lethality level. The modification of a 4-D state that is transitioned from "occupied—needs terrain mask check" to "occupied" can be quickly computed by subtracting the number of lethality levels from its original 4-D state value. The following equation may be utilized indicate how to compute the new 4-D state value for this state transition: L(Occupied,TLL)=L(ONTMC,TLL)-N, where L is the Lethality Table for Occupied 4-D States, Occupied represents the 4-D status state for "Occupied," TLL is the threat lethal level, ONTMC is the 4-D status state acronym for "Occupied needs—terrain mask check," and N is the number of lethal levels.

Once the ELDETREE has been populated, the global path planner A* of system 200 may plan a reference path for further refinement later. For previous Airborne E* designs, A* planner only searches 4-D states in ELDETREE with values compliant with the following equation: $F(x,y,z,t) \leq$ Unoccupied, where (x,y,z,t) is the value listed in FIG. 4A and FIG. 4B for the 4-D state at (x,y,z,t).

To enable the global path planner A* of system 200 to consider states within a lethality level of a threat, a user must specify a Lethality Tolerance Level (LTL). For example, assume that the user may tolerate up to risk level of "Lethal Level 1." Then LTL may be defined as: LTL=L(Occupied, Lethal_Level-1), where L is the lethality matrix in FIG. 4B for Occupied 4-D States, "Occupied" is the state status, and Lethal_Level-1 is the Lethal Level 1.

For example, the system 200 A* planner is may be updated to only search 4-D states that comply with the following: $F(x,y,z,t) \leq LTL$, where x,y,z are coordinates for the state and t represents the traversal time at this 4-D state. The A* planner of system 200 not only may expand threat states with risk levels that are tolerable, but also may find and present a reduced risk path. For example, if two possible paths may exist, and the first path involves traversing through a TLL=3 for 30 seconds and the second path is completely free of threats (i.e., TLL=0), but is 5 minutes longer and uses 33 lbs. more fuel, a further analysis of path cost will determine the answer.

In another example, the system 200 A* planner may compare the path cost of traversing 30 seconds inside a threat zone of TLL=3 versus the path cost of traversing through area with TLL=0, but is 5 minutes longer and uses 33 lbs. more fuel. In addition to different threat levels, of system 200 also may analyze different risk types, such as fuel risk, time risk, restricted airspace risk, and threat risk, including an association of each risk type with a threat level.

In another example, the system 200 may assign an additional path cost for the time period of the re-routed path that is inside a threat zone. This additional path cost is added to traveling time to any 4-D state that has a TLL>0. The additional path cost of traversing through a threat zone is accounted for by: ETC(Y)=TLL(Y)*RiskFactor(RTL,RT), wherein c(X,Y)'=c(X,Y)+t(X,Y)*ETC(Y), where X and Y are 4-D states compliant with $F(x,y,z,t) \leq LTL$ above, ETC(Y) is the extra traversal cost per second, TLL(Y) is the Threat Lethal Level for state Y, RTL is the Risk Tolerance Level and is specified by operators, RT is the Risk Type and is specified by operators, RiskFactor(RTL, RT) is a factor to account for the additional path cost for traveling through lethal zones and is a function of RTL and RT, t(X,Y) is the traversal time from state Y to state X; c(X,Y) is the path cost from state Y to state X without the additional penalty of traversing through a threat zone, and c(X,Y)' is the path cost from state Y to state X with the additional penalty of traversing through a threat zone.

In embodiments, the operator of the system 200 may use different risk tolerance levels to accomplish a mission objective. In addition, different missions may require the path planner to use different tolerance levels. RiskFactor in the above equation may allow the determination of the additional path cost for traveling through lethal zones to be based on user preference (or tolerance), because RiskFactor is a function of the user specified values: RTL and RT.

Referring to FIG. 5, a table of exemplary Risk Type (RT) versus Risk Tolerance Level (RTL) displaying multiple levels of risk and associated values of RiskFactor is shown. in accordance with one or more embodiments of this disclosure. FIG. 5 lists the values of RiskFactor currently used by Airborne E* for an exemplary three RTs and five lethal RTLs. An unlimited number of RTs and an unlimited number RTLs may be incorporated within the methods of the risk-aware contingency flight re-planner dependent upon onboard computing resources. Airborne E* may also work with RiskFactor possessing values specifically tailored to a particular user. For example, a Level 2 RTL for one specific user may include entry into a target tracking radar range while a Level 3 RTL may include entry into the range of a surface to air missile. For a second user, Level 2 RTL may include entry into an area of severe turbulence. In FIG. 5, $\eta i$ and $\mu i$ are determined as follows:

For i=0:4
if i≤$RTL_\mu$ then
$\eta i=0, \mu i=1$
else
$\eta i=\infty, \mu i=\infty$ Fuel risk is one type of risk that is of consistent importance to operators of vehicles, and particularly important to operators of an airborne vehicle. Fuel risk captures the risk of running out of fuel because the re-routed path is too long, even if the re-routed path is completely free of threats. Capturing the exact fuel burn for each flight leg is quite complicated since fuel burn may depend on a number of variables, such as temperature, density of air and aircraft weight. For simplicity and computational efficiency, A* planner of the system 200 may utilize an average fuel flow with a constant velocity to calculate the approximate fuel consumption of the re-routed path. At the path refinement stage, the system 200 may determine a more accurate fuel burn for each flight leg. The first step for fuel risk is to determine how much fuel is available for a re-routed segment. For example, the following equation may determine the fuel available for the re-routed path segment: $Fuel_{avail}=TFOB-Fuel_{FP}+Fuel_{DP}^{RP}$, where TFOB is the total fuel on board the aircraft, $Fuel_{FP}$ is the fuel consumed by the active flight plan from the current aircraft location onward to the destination, and $Fuel_{DP}^{RP}$ is the fuel consumed between the deviation point 150 and the rejoin point 130 of the active flight plan.

Time risk captures the required time on target (RToT) constraint that is placed on a waypoint (or target) and may be computed together with fuel risk since both of them depend on the available fuel. With an RToT constraint, the aircraft may not be able to deviate too far away from the active flight path during re-route. System 200 considers fuel and time risks with the following equations:

$$Time_{avail}=min(RTot, Fuel_{avail}/FF_{avg}), t(Y,DP)=t(X,DP)+t(X,Y), \text{ and}$$

$$c(X,Y)'=\{[c(X,Y)+t(X,Y)*ETC(Y)*OTF, t(Y,DP)> Time_{avail}][c(X,Y)+t(X,Y)*ETC(Y), t(Y,DP)\leq Time_{avail}]\}$$

Where: RToT is the required time on target constraint in terms of elapsed time from the deviation point, $FF_{avg}$ is the average fuel flow, t(X, DP) is the accumulated time from the deviation point to the current state, t(X,Y) is the time period it takes to travel from state Y to state X, c(X,Y) is the arc cost from state Y to state X without additional penalty, ETC(Y) is the extra traversal costs to travel to state Y, OTF (OverTimeFactor) is the factor to penalize a 4-D state for exceeding available fuel or RToT. The OverTimeFactor value is set as the highest lethal level since this situation should be treated as the most dangerous condition.

Restricted airspace risk captures the risk of traveling into a restricted airspace. The restricted airspace may be any type of airspace that has been defined as restricted for one or more types of aircraft through municipal, state, or federal governing authority. For example, the restricted airspace may be configured as a military operations area (MOA) having an airspace designated outside of Class A airspace. In another example, the restricted airspace may be configured as a temporary flight restriction (TRF) issued by a federal aviation governing body. In another example, the restricted airspace may be defined within altitude restriction rules as detailed below. System 200 considers restricted airspace risk via any algorithms or functions including but not limited to functions similar to time risk and/or fuel risk.

System 200 may further refine the candidate paths based on additional input from the A* planner. The path refinement stage of Airborne E* must be modified similar to A* planner of system 200 to accept an input of different RTs and RTLs. Thus, for a 4-D state to be part of a path candidate G, it must comply with: $S=F(x,y,z,t)$, $S \leq LTL$, and $\forall S \notin G$, where S represents a 4-D state, $F(x,y,z,t)$, in the ELDETREE, LTL is lethality tolerance level, $\forall S$ represents all 4-D states of S, and G is one feasible path solution.

In some embodiments, path refinement utilizes a Genetic Algorithm (GA) to ensure the final selected route will comply with flight constraints where fuel or time is already used in the fitness calculation. The GA is described in detail in the '068 patent. Additional cost is added to the path cost to account for different threat levels and enable the planner to minimize the risk exposure time. For example: Threat_Exposure(G)=t(S)*ETC(S),$\forall S \notin G$, and Path_Cost(G)'= (|Path_Cost(G)−RToT|+Threat_Exposure(G)), where t(S) is the time period for traversing within state S, ETC(S) is the extra traversal cost for state S due to threats, Path_Cost(G) is the path traversal time for path candidate G, RToT is the required time on target, if there is an RToT requirement. If there is no RToT constraint, system 200 will set RToT to zero.

In some embodiments, the path planning algorithm is updated such that for any candidate path, the exposure time to a threat region 0 through n ($t_0 \ldots t_n$) is tracked (i.e., the system 200 determines an association of an exposure cost with at least one route). For example, for a node-based search algorithm like A*, the incremental cost (ΔC) to travel to a new node may be equal to:

$$\Delta C = f(x,y,z,t) + g(t_0, \ldots t_n)$$

wherein f(x,y,z,t) is the baseline cost function that accounts for fixed or dynamic threat regions, and $g(t_0, \ldots t_n)$ accounts for exposure-time threats.

Figure 5B:
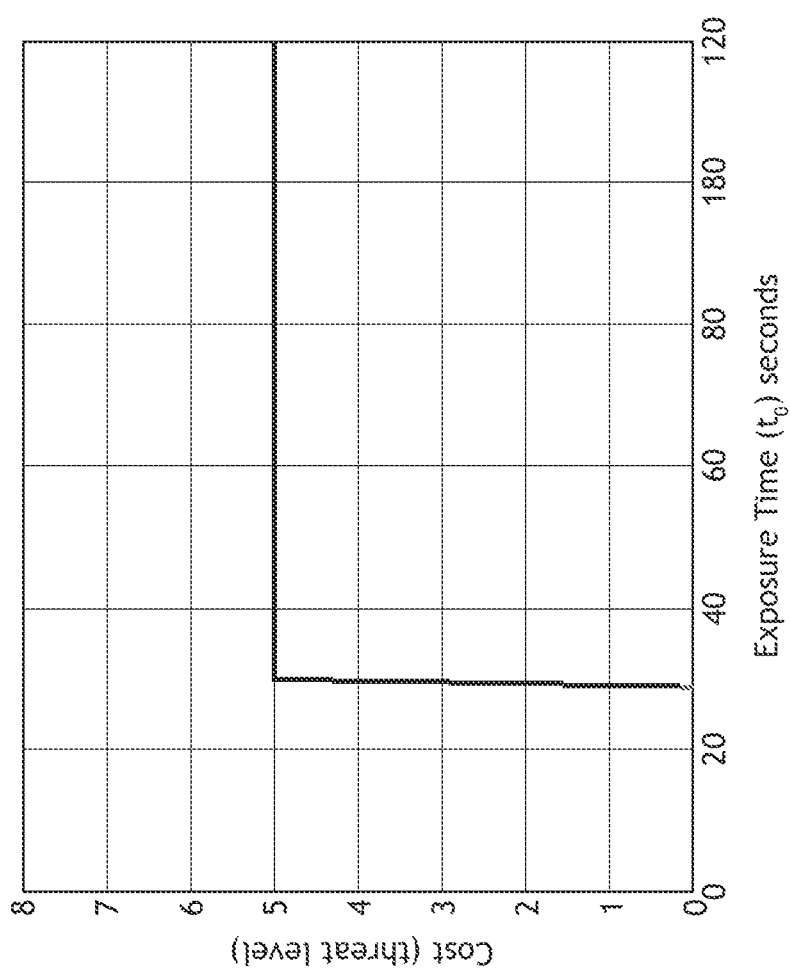
FIG. 5B is a graph illustrating a threat level cost versus exposure time, in accordance with one or more embodiments of this disclosure.

FIG. 5B is a graph illustrating threat level cost versus exposure time, in accordance with one or more embodiments of this disclosure. The example shown in FIG. 5B represents a simple step function g(ti), which has an initial threat of zero, but then grows after 30 seconds of exposure. Therefore, the cost (e.g., threat level) is tracked as a function of time that the vehicle is in the treat zone, rather than absolute time. Tracking the threat level as a function of time may be useful in situations where the threat level in a threat zone is contingent on exposure time. For example, an aircraft entering into a threat zone (e.g., adversarial territory) with surface to air missiles may have a relatively low risk per unit time for as long as it takes the missile system to activate and lock onto a target (e.g., zero threat level for the first 30 seconds in the threat zone, as shown in FIG. 5B). However, after 30 seconds, the threat level increases dramatically as the surface to air missiles are now capable of launch (e.g., threat level five as shown in FIG. 5B). The system 200 may determine, via the tracked threat cost as a function of exposure time algorithm, that a route that requires 20 seconds of flight time into the threat zone is acceptable. For instance, the system 200 may determine that the 20 seconds of flight time in the threat zone may save 40 seconds of flight time spent circumventing the threat zone, a significant time savings when performing mission tasks. These types of threats cannot be modeled using current route planning algorithms and/or functions, as the dynamic nature of the threat changes during the time that the vehicle is exposed to the threat, rather than changing over absolute time.

Another example involves the requirement that flight between 12,500 feet and 14,000 feet for longer that 30 minutes is not permitted without supplemental oxygen (FAA rule 91.211). To follow these guidelines, the system 200 may be configured to plan a route where the aircraft 110 (e.g., without supplemental oxygen) will fly at 13,000 feet for 20 minutes (e.g., at zero or near-zero threat level) before returning to less than 12, 500 feet. For instance, the aircraft may need to temporarily fly at 13,000 feet to clear a mountain peak, and the system 200 may calculate, via the tracked threat cost as a function of exposure time algorithm, a route to both clear the peak while adhering to FAA rules. The exposure time to a threat region 0 through n ($t_0 \ldots t_n$) may be tracked cumulatively (e.g., total exposure time in one or more threat regions) or singularly *e.g., total exposure time in a single threat region).

In some embodiments, the system 200 may be configured to reset, or set to zero, the threat cost (e.g., tracked exposure time). For example, for aircraft adhering to FAA rule 91.221 the 30-minute window for 12,500 ft to 14,000 flight may reset once the aircraft flies below 12,500 feet. This would be beneficial when flying through a range of mountains, where the aircraft needs to fly over 12,500 feet intermittently to avoid peaks. The system 200 may then, via a resettable tracked threat cost as a function of exposure time algorithm, plan a route that includes two or more short flight times (e.g., less than 30 minutes) above 12,500 feet (e.g., the system 200 plans a route above or around terrain that would ease in-cockpit flight planning and protect the pilot against attempting an unsafe route).

It should be understood that multiple types of algorithms/functions may be used that track threat level cost as a function of time. The simple step function represented in FIG. 5B is one of an unlimited number of functions (e.g., linear and/or nonlinear functions) that track threat level cost as a function of time. Therefore, the above description should not be interpreted as a limitation of the present disclosure, but merely as an illustration.

Figure 6:
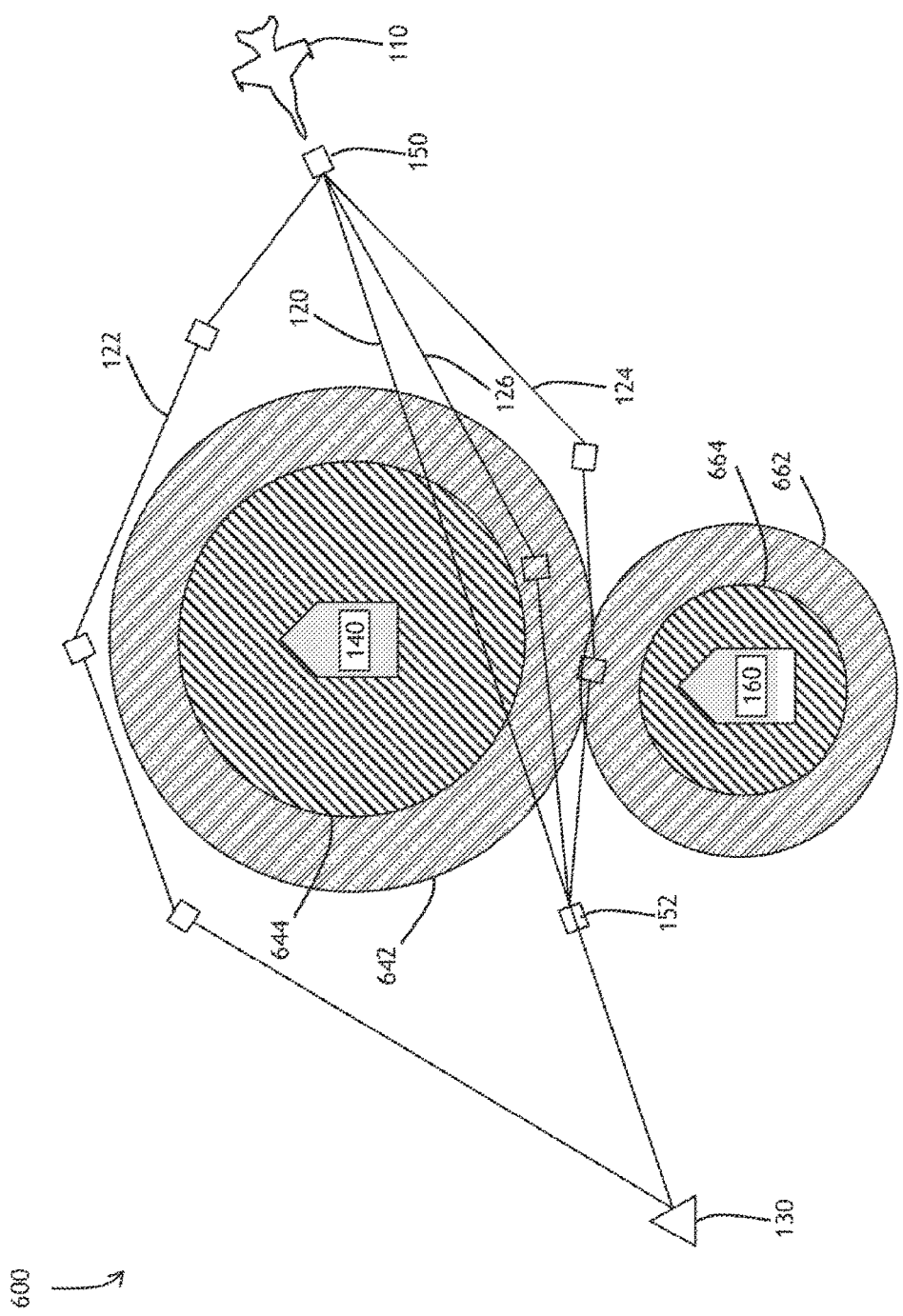
FIG. 6 is a diagram of obstacles which intersect an active planned flight path and risk aware alternative re-routes for the aircraft, in accordance with one or more embodiments of this disclosure.

FIG. 6 illustrates a diagram of obstacles which intersect an active planned flight path and risk aware alternative re-routes for the aircraft, in accordance with one or more embodiments of this disclosure. At departure time, aircraft 110 is assigned an original route 120 to traverse from deviation point 150 to rejoin point 130. After departure, threats emerge along the active original route 120. Threats 140 and 160 are unplanned threats and pose an unplanned level of risk to aircraft 110. Surrounding each threat 140, 160, shapes (here circular) of risk levels indicate multiple levels of risk associated with each threat. A first level of risk shape 642 may indicate a first level of risk while a greater level of risk may be indicated by shape 644. For example, shape 642 may represent a target tracking radar of a surface to air missile system 200 while shape 644 may indicate an engagement zone of the missile system 200. The engagement zone would naturally present a higher level of risk than would the target tracking radar. Should aircraft 110 continue on planned route 120, a high level of risk would be encountered within the engagement zone of the surface to air missile system 200 placing the aircraft 110 in a possible dangerous situation.

The risk-aware contingency flight re-planner may operate to offer a decision maker a choice of risk aware alternate routes. Several exemplary alternate routes are indicated in FIG. 6. Each of the alternate routes may offer the decision maker a variable level of risk. Should $Fuel_{avail}$ and RToT be not the limiting factors, risk aware alternate route 122 may be a first choice of the decision maker as route 122 remains clear of all threats. However, route 122 requires substantially more fuel and time than one of the alternative choices.

Route 124 may offer one option to the decision maker. As indicated, route 124 remains clear of shape 642 while it does traverse shape 662. For example, shape 662 may indicate light rain showers while shape 664 represents heavy thunderstorm activity. The decision may prove beneficial to aircraft 110 to accept the lower risk of light rain showers than to allow an unfriendly entity to track the aircraft with a target tracking radar.

Should $Fuel_{avail}$ or RToT be the limiting factors, a risk aware alternate route 126 may be a first choice of the decision maker. The distance from deviation point 150 to rejoin point 130 through waypoint 152 is the shortest as indicated by original route 120. The shortest time and fuel based alternative risk aware re-route may be the risk aware alternate route 126. Although the risk aware alternate route 126 may traverse shape 642, the traversal of shape 642 (target tracking radar) may be of lesser risk than would a deviation from an assigned RToT or a traversal of shape 644 (missile engagement zone).

Further, RToT may be configured as a window of time within which the aircraft 110 must be at a specific rejoin point 130. the risk aware alternate route 126 and route 124 may offer the decision maker the ability to arrive at rejoin point 130 within the assigned RToT window while route 122 may not.

Figure 7:
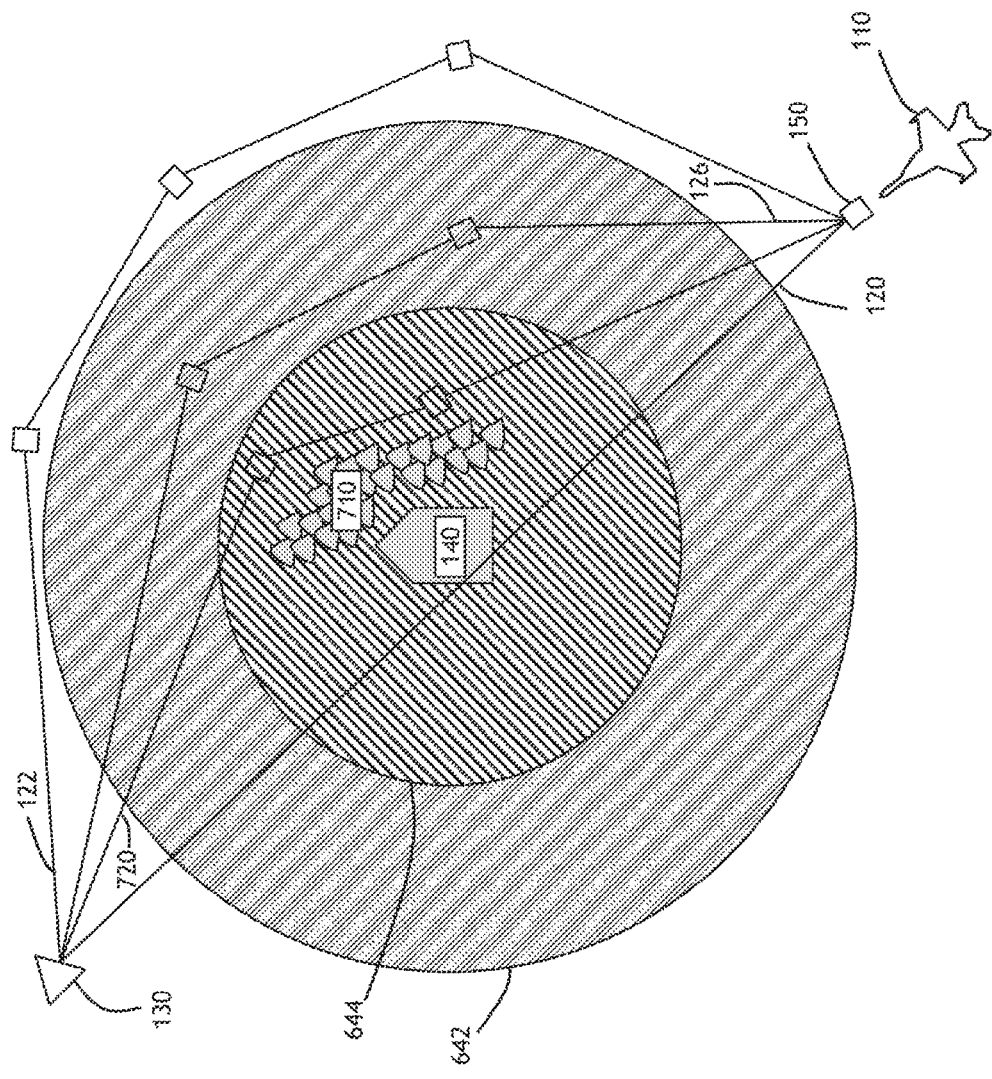
FIG. 7 is a diagram of obstacles which intersect a planned flight path and alternative terrain masking re-routes of the aircraft, in accordance with one or more embodiments of this disclosure.

Referring to FIG. 7, a diagram of obstacles which intersect a planned flight path and alternative terrain masking re-routes of the aircraft 110 is shown, in accordance with one or more embodiments of this disclosure. Terrain 710 offers additional options to the decision maker. Here, risk-aware alternative route 720 may traverse shape 644. The unoccupied status of states comprising risk-aware re-route 720 may lead ELDETREE to generate and present route 720 to the decision maker as one recommended option.

Risks from alternate threats may offset the quality of a given route. For example, the fuel risk of an aircraft flying route 122 may be the same as the threat or terrain risk of an aircraft flying route 720. In another example, the time risk of route 720 may be the same as threat risk of route 120 (e.g., unplanned threat 140). As above, should there be an RToT, a Time Risk may preclude selection and presentation of route 720 since the distance of route 720 may be too great to ensure accurate arrival at rejoin point 130.

Figure 8:
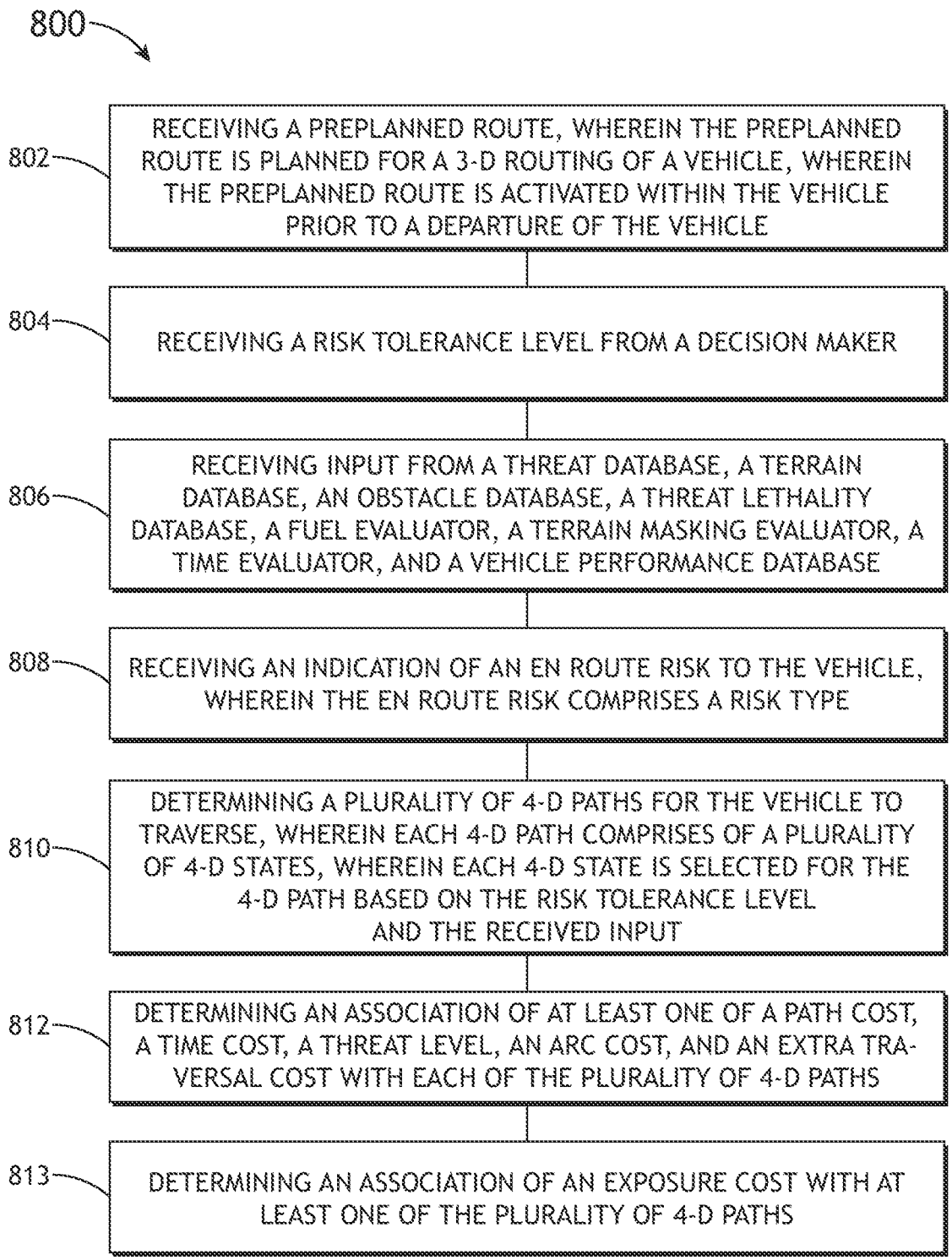
FIG. 8 is a flow diagram of a method for risk aware contingency flight re-routing, in accordance with one or more embodiments of this disclosure.
Figure 8:
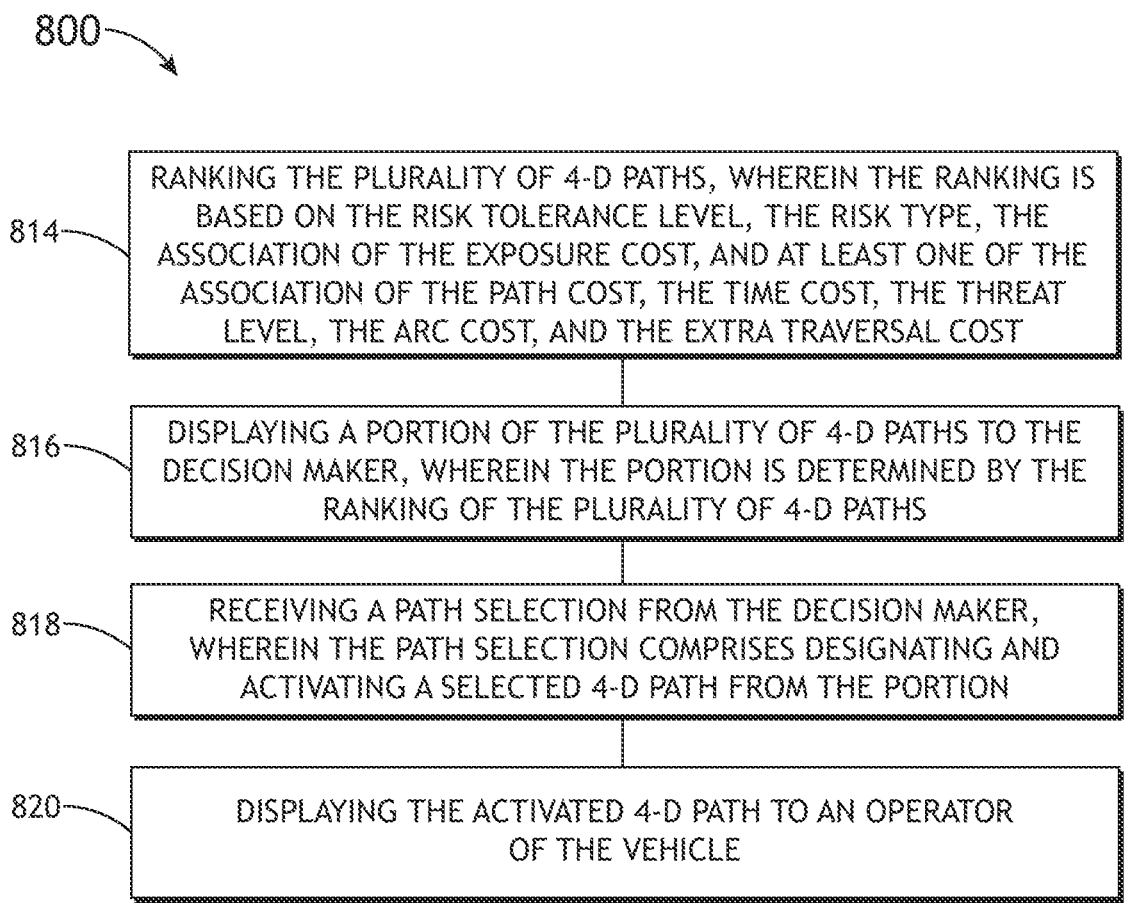

Referring to FIG. 8, a flow diagram of a method 800 for risk aware contingency flight re-routing representative is shown, in accordance with one or more embodiments of this disclosure. In some embodiments, method 800 may include a step 802 of receiving a preplanned route, wherein the preplanned route is planned for a 3-D routing of a vehicle, wherein the preplanned route is activated within the vehicle prior to a departure of the vehicle.

In some embodiments, the method 800 includes a step 804, of receiving a risk tolerance level from a decision maker. In some embodiments, the method 800 includes a step 806 or receiving input from a threat database, a terrain database, an obstacle database, a threat lethality database, a fuel evaluator, a terrain masking evaluator, a time evaluator, and a vehicle performance database. For example, the received input may include an attribute of a medium through which the vehicle is designed to traverse. For instance, the attribute may include one of an air characteristic or water characteristic. In some embodiments, the method 800 includes a step 808 of receiving an indication of an en route risk to the vehicle, wherein the en route risk includes a risk type. The indication of an en route risk may comprise any risk to a vehicle including but not limited to a hostile surface threat, a weather threat, a hostile airborne a space-based threat, a restricted airspace threat, or a subsurface threat. The indication may be received by any technology available. For example, the reception of the indication may be received via a digital link, an analog data link, a VHF signal, or a satellite communications system.

In some embodiments, the method 800 includes a step 810 of determining a plurality of 4-D paths for the vehicle to traverse, each 4-D path comprised of a plurality of 4-D states, wherein each 4-D state in each 4-D path is selected for the 4-D path based on the risk tolerance level and the received input. In some embodiments, the method 800 includes a step 812 of determining an association of at least one of: a path cost, a time cost, a threat level, an arc cost, and an extra traversal cost with each of the plurality of 4-D paths.

In some embodiments, the method 800 includes a step 813 of determining an association of an exposure cost with at least one of the plurality of 4-D paths. In some embodiments, the method includes a step 814 of ranking the plurality of 4-D paths, wherein the ranking is based on the risk tolerance level, the risk type, the association of the exposure cost, and at least one of the association of the path cost, the time cost, the threat level, the arc cost, and the extra traversal cost.

In some embodiments, the method 800 includes a step 816 of displaying a portion of the plurality of 4-D paths to the decision maker, wherein the portion is determined by the ranking of the plurality of 4-D paths. In some embodiments, the method includes a step 818 of receiving a path selection from the decision maker, wherein the path selection comprises designating and activating a selected 4-D path from the portion. In some embodiments, the method 800 includes a step 820 or displaying the activated 4-D path to an operator of the vehicle.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although disclosed concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosed concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
    a display;
    a flight management system interface configured to allow for user selection of alternate routes; and
    a computer readable medium having non-transitory computer readable program code embodied therein for risk-aware contingency flight re-planning, the computer readable program code comprising instructions which, when executed by a computer device or processor, perform and direct the steps of:
        receiving a preplanned route prior to a departure of a vehicle, wherein the preplanned route is configured for a 3-D routing of the vehicle;
        receiving a risk tolerance level from a decision maker;
        receiving input from a threat database, a terrain database, an obstacle database, a threat lethality database, a fuel evaluator, a terrain masking evaluator, a time evaluator, and a vehicle performance database;
        receiving an indication of an en route risk to the vehicle, wherein the en route risk comprises a risk type and is associated with one or more threat zones;
        determining a plurality of 4-D paths for the vehicle to traverse, wherein each 4-D path is comprised of a plurality of 4-D states, and wherein each 4-D state selected for the 4-D path configured based on the risk tolerance level and the received input, wherein the plurality of 4-D paths are alternate routes relative to the preplanned route;
        determining an association of at least one of a path cost, a time cost, a threat level, an arc cost, and an extra traversal cost with each of the plurality of 4-D paths;
        determining an association of an exposure cost with each of the plurality of 4-D paths, wherein the exposure cost is based on a variation of the threat level as a function of exposure time, wherein the exposure time is based on an amount of time the vehicle is located within one or more threat zones;
        ranking the plurality of 4-D paths, wherein the ranking is based on the risk tolerance level, the risk type, the association of the exposure cost, and the association of at least one of the path cost, the time cost, the threat level, the arc cost, and the extra traversal cost;
        displaying, via the display, a portion of the plurality of 4-D paths to the decision maker, wherein the portion is determined by the ranking of the plurality of 4-D paths;
        receiving, via the flight management system interface, a path selection from the decision maker, wherein the path selection comprises designating and activating a selected 4-D path from the portion;
        displaying, via the display, the activated 4-D path to an operator of the vehicle.

2. The system of claim 1, wherein the preplanned route planned for the 3-D routing of the vehicle further comprises a 3-D route planned for an aircraft.

3. The system of claim 1, wherein the preplanned route planned for the 3-D routing of the vehicle further comprises a 4-D path, a 3-D path, or a 2-D path.

4. The system of claim 1, wherein the risk tolerance level further comprises a plurality of levels of risk tolerance, the plurality of levels of risk tolerance based on the path selection from the decision maker.

5. The system of claim 1, wherein the received input further comprises an attribute of a medium through which the vehicle is designed to traverse.

6. The system of claim 1, wherein the indication of the en route risk to the vehicle further comprises an indication of at least one of a hostile surface threat, a weather threat, a hostile airborne a space-based threat, a restricted airspace threat, or a subsurface threat.

7. The system of claim 1, wherein the risk type further comprises one of: a threat risk, a fuel risk, a restricted airspace risk, and a required time on target risk.

8. The system of claim 1, wherein the receiving an indication further comprises a reception via at least one of a digital or analog data link, a VHF signal, or a satellite communications system.

9. The system of claim 1, wherein the decision maker is the operator.

10. A method for risk-aware contingency flight re-planning, comprising:
    receiving a preplanned route prior to a departure of a vehicle, wherein the preplanned route is planned for a 3-D routing of the vehicle;
    receiving a risk tolerance level from a decision maker;
    receiving input from a threat database, a terrain database, an obstacle database, a threat lethality database, a fuel evaluator, a terrain masking evaluator, a time evaluator, and a vehicle performance database;
    receiving an indication of an en route risk to the vehicle, wherein the en route risk comprises a risk type and is associated with one or more threat zones;

determining a plurality of 4-D paths for the vehicle to traverse, wherein each 4-D path comprises of a plurality of 4-D states, wherein each 4-D state is selected for the 4-D path based on the risk tolerance level and the received input, wherein the plurality of 4-D paths are alternate routes relative to the preplanned route;

determining an association of at least one of a path cost, a time cost, a threat level, an arc cost, and an extra traversal cost with each of the plurality of 4-D paths;

determining an association of an exposure cost with each of the plurality of 4-D paths, wherein the exposure cost is based on a variation of the threat level as a function of exposure time, wherein the exposure time is based on an amount of time the vehicle is located within one or more threat zones;

ranking the plurality of 4-D paths, wherein the ranking is based on the risk tolerance level, the risk type, the association of the exposure cost, and at least one of the association of the path cost, the time cost, the threat level, the arc cost, and the extra traversal cost;

displaying, via a display of a system, a portion of the plurality of 4-D paths to the decision maker, wherein the portion is determined by the ranking of the plurality of 4-D paths;

receiving, via a flight management system interface configured to allow for user selection of alternate routes, a path selection from the decision maker, wherein the path selection comprises designating and activating a selected 4-D path from the portion; and displaying, via the display, the activated 4-D path to an operator of the vehicle.

11. The method of claim 10, wherein the preplanned route planned for the 3-D routing of a vehicle further comprises a 3-D route planned for an aircraft.

* * * * *